Feb. 12, 1952 J. O. HAM 2,585,768
SHOCK ABSORBING TOW BAR
Filed June 12, 1950 2 SHEETS—SHEET 1

James O. Ham
INVENTOR.

Feb. 12, 1952  J. O. HAM  2,585,768
SHOCK ABSORBING TOW BAR
Filed June 12, 1950  2 SHEETS—SHEET 2
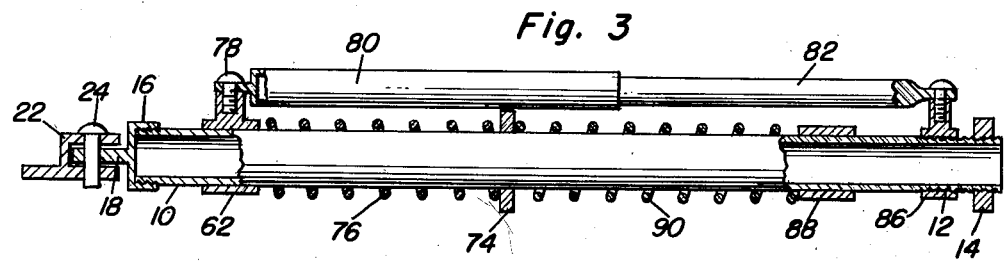
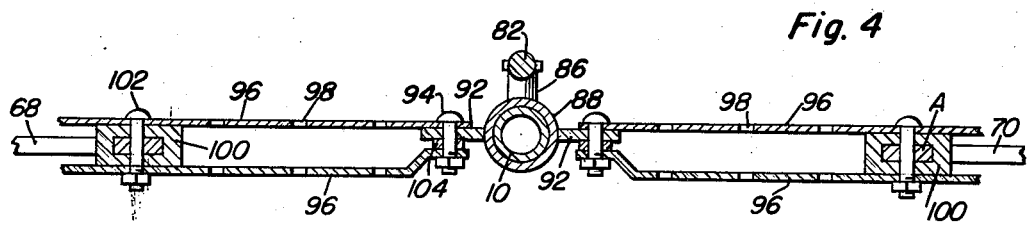
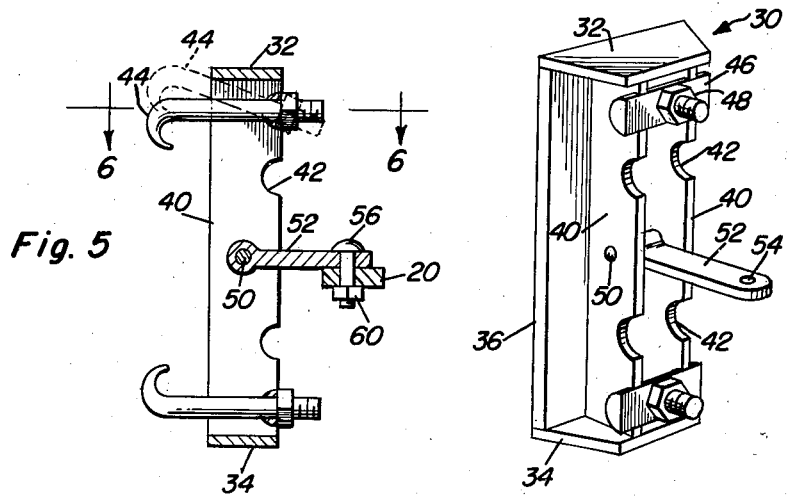
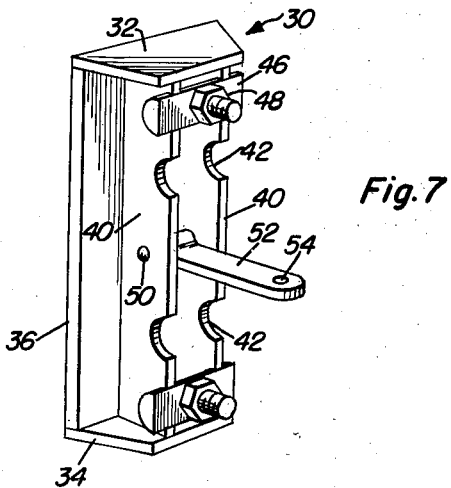
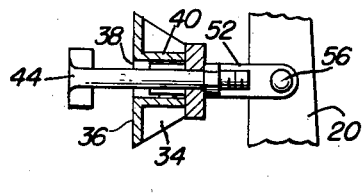
James O. Ham
INVENTOR.

Patented Feb. 12, 1952

2,585,768

UNITED STATES PATENT OFFICE 2,585,768

SHOCK ABSORBING TOW BAR

James O. Ham, Goldsboro, N. C.

Application June 12, 1950, Serial No. 167,551

5 Claims. (Cl. 280—33.9)

This invention relates to a shock-absorbing tow bar and has for its primary object to provide a detachable coupling between a towing vehicle and a towed vehicle which will effectively absorb shocks imparted to both vehicles, particularly upon sudden stopping and quick starting of the towing vehicle.

Another important object of this invention is to provide a shock-absorbing tow bar which may be readily adjusted both horizontally and vertically upon both the towing and towed vehicle.

Yet another object of this invention is to provide a shock-absorbing tow bar construction which may be maintained in a horizontal position to prevent the towed car from running under and lifting up the towing car.

These, together with various ancillary objects and features of the invention which will later become apparent as the following description proceeds, are attained by the device, a preferred embodiment of which has been illustrated, by way of example only, in the accompanying drawings, wherein:

Figure 3 is a sectional view taken substantially on the plane of section line 3—3 of Figure 1;

Figure 4 is a sectional view taken substantially on the plane of section line 4—4 of Figure 1;

Figure 5 is a sectional view taken substantially on the plane of section line 5—5 of Figure 1;

Figure 6 is a sectional view taken substantially on the plane of section line 6—6 of Figure 5; and Figure 7 is a perspective view of one of the bumper attaching brackets.

Specific reference will now be made to the drawings. In the several views, in the accompanying drawings and in the following specification, similar reference characters indicate corresponding elements throughout.

Figure 1:
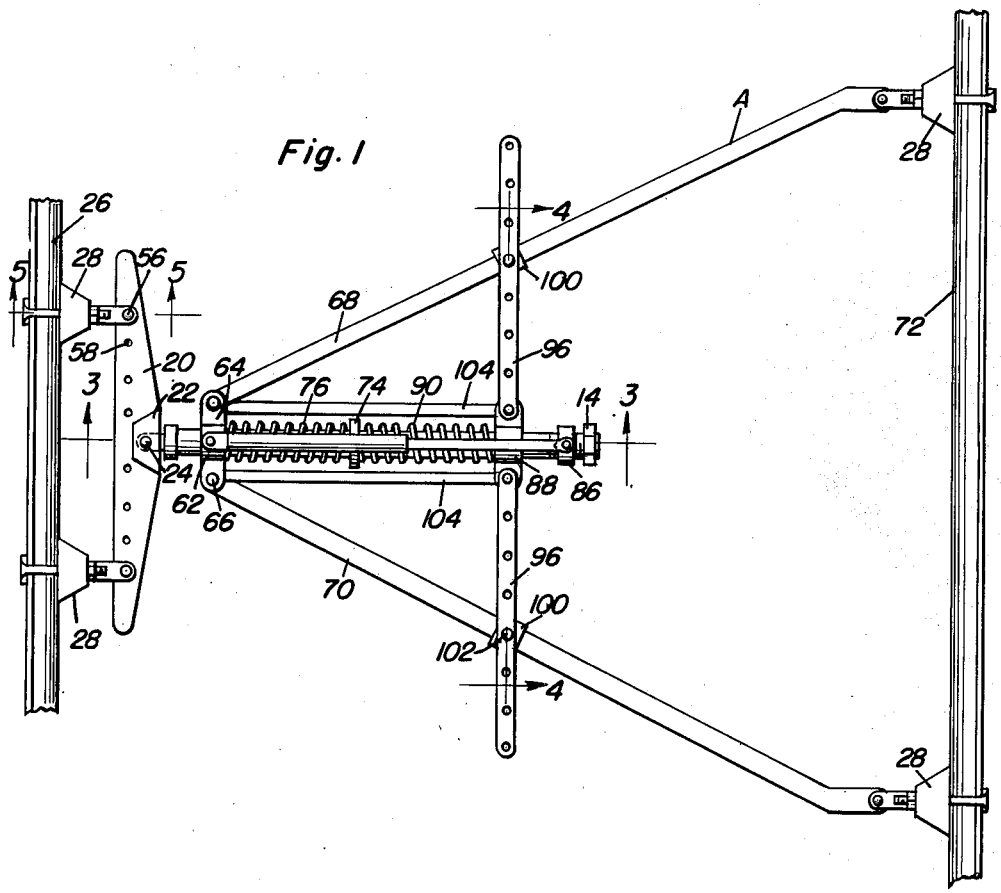
Figure 1 is a top plan view of the device.
Figure 2:
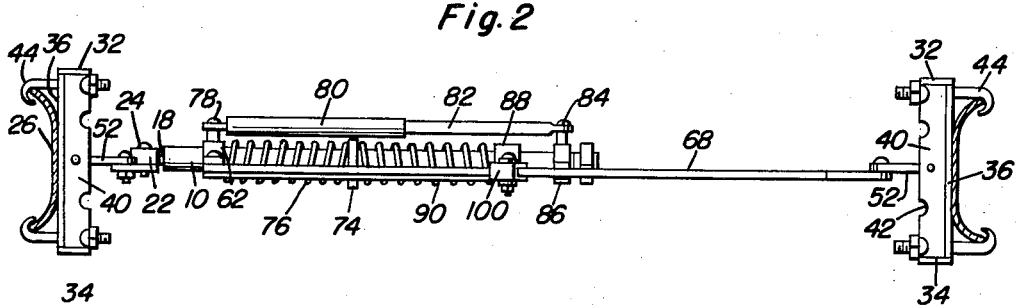
Figure 2 is a side elevational view of the device, the bumpers being shown in vertical section.

The present tow bar construction comprises an elongated shaft in the form of a cylindrical tubular member 10 having an externally threaded end 12 upon which is received a nut 14 for a purpose later to appear. The other end of the shaft 10 includes a closure 16 carrying a longitudinally extending apertured lug 18. A transversely extending plate 20 is provided having a raised, substantially U-shaped portion 22 centrally between its ends, the lug 18 extending into the portion 22 and a headed pivot pin 24 is made to extend through the portion 22 and the aperture in the lug 18 so that the shaft 10 is limited in its vertical movement but is horizontally pivotal on the plate 20.

A means for adjustably clamping the plate 20 upon the bumper 26 of the towing vehicle is provided. This means comprises a pair of adjustable clamps 28, the complete construction of each of which is shown clearly in Figures 5 to 7. Each bracket includes a U-shaped member 30 having upper and lower leg portions 32 and 34 connected by a web portion 36. A longitudinal slot 38 is provided in the web portion and appropriately secured between the legs 32 and 34 and to the web portion 36 on both sides of the slot is a pair of vertically extending, spaced parallel plates 40 having horizontally aligned arcuate, vertically spaced recesses 42. Extending between the plates 40 and through the slot 38 is a pair of hook members 44 which are adapted to hook over the bottom and top edges of the bumper 26. The hook members are threaded at their ends to receive an arcuate bearing 46 selectively receivable in the aligned arcuate recesses 42, a closure nut 48 being received upon the threaded ends of the hook members to retain the bearing 46 properly in place. It will thus be seen that each of the clamps 28 is vertically adjustable to accommodate bumpers varying in width and each hook member is capable of swivel action as shown clearly in dotted lines in Figure 5. Vertically pivoted, as at 50, between the plates 40 is a lug 52 which is apertured, as at 54, to receive a pin 56 selectively engageable in one of the plurality of longitudinally spaced apertures 58 in the plate 20, the pins 56 being threaded at their ends to receive closure nuts 60.

Slidably received upon the shaft 10 adjacent its pivoted end is a collar 62 having laterally extending lugs 64 for securing, as at 66, a pair of rearwardly diverging bars 68 and 70 which are in turn secured at their other ends adjustably to the bumper 72 of the towed vehicle by means of clamps 28. Secured centrally to the shaft 10 is an annular flange or ring 74 and interposed between the ring 74 and the slidable collar 62 and wound about the shaft 10 is a coil spring 76 which is tensioned to normally urge the slidable collar toward the plate 20. Secured by means of an appropriate screw 78 to the upper end of the slidable collar 62 is one end of a cylinder 80 in which is slidably received a piston rod 82 that is secured at its free end by means of a screw 84 to a nut 86 adjustably threaded upon the threaded end 12 of the shaft 10.

A second collar 88 is slidably positioned upon the shaft 10 adjacent the threaded end 12 thereof and interposed between the collar 88 and the ring 74 on the shaft is a further coil spring 90 which normally urges the collar 88 toward the threaded free end of the shaft 10. The collar 88 includes oppositely extending lugs 92 for securing, by means of the bolt and nut 94, transversely extending, vertically spaced bars 96 which are apertured, as at 98, for a purpose later to appear. A block 100 is slidably received on the intermediate portion of each of the diverging bars 68 and 70 and is also received between the spaced, transversely extending bars 96. A bolt and nut 102 is selectively received through one of the apertures 98 and also extends through the block 100 and the bars 68 and 70 so that, in effect, the slidable collar 88 may be secured adjustably, in a transverse direction to the intermediate portions of the diverging bars 68 and 70. The longitudinally extending bars 104 are secured between the two slidable collars 62 and 88 to lend rigidity to the entire tow bar construction.

In use, the tow bar may be assembled and adjusted horizontally and vertically of the towing vehicle and the towed vehicle in a manner which will be readily apparent to one skilled in the art. The present tow bar construction also allows for shock absorption upon sudden stopping and starting of the towing vehicle in two directions. Should the towing vehicle stop suddenly, the inertia of the towed vehicle will cause the slidable collar 88, because it carries the divergent bars 68 and 70, to compress the coil spring 90. Should the towing vehicle start suddenly, the slidable collar 62 will move in a direction to the right of the figures, compressing the coil spring 76 and also moving the cylinder 80 over the piston rod 82 for complete absorption of shock.

Having described the invention, what is claimed as new is:

1. A tow bar comprising a shaft, a plate horizontally pivoted to one end of said shaft, means for adjustably clamping said plate to the bumper of a towing vehicle, a first collar slidable on said shaft adjacent its pivoted end, resilient means urging said first collar towards said pivoted end, elongated bars secured at one of their ends to said first collar, means for securing the other ends of said bars to the bumper of a towed vehicle in vertically adjusted position, a second collar slidable on said shaft adjacent its free end, means for adjustably retaining the intermediate portions of said bars on said second collar, resilient means urging said second collar towards said free end of said shaft, and shock-absorbing means mounted on said shaft, said shock-absorbing means including a cylinder secured at one of its ends to said first collar and a piston slidable in said cylinder and adjustably secured at its outer end to the free end of said shaft.

2. The combination of claim 1 wherein first-named clamping means includes a substantially U-shaped member having a longitudinal slot in its web, a pair of vertical spaced plates secured to the web on both sides of said slot, vertically spaced arcuate recesses in the free edges of said plates, hooks extending through said slot having arcuate bearings selectively received in said recesses, and means pivotally securing said vertical plates to said first-named plate.

3. The combination of claim 1 wherein said means for adjustably retaining the intermediate portions of said bars on said second collar includes opposing ears on said second collar, further bars having longitudinally spaced apertures and secured at one of their ends upon said ears, and bolts selectively received in said apertures and extending through the intermediate portions of said first-named bars.

4. The combination of claim 1 wherein last-named resilient means includes an annular ring secured centrally to said shaft and a coil spring about said shaft between said ring and said second collar.

5. The combination of claim 1 wherein said first-named resilient means includes an annular ring secured centrally to said shaft and a coil spring about said shaft between said ring and said first collar.

JAMES O. HAM.

REFERENCES CITED

The following references are of record in the file of this patent:

UNITED STATES PATENTS

| Number | Name | Date |
| --- | --- | --- |
| 1,487,464 | Morrison | Mar. 18, 1924 |
| 1,896,427 | Selvester | Feb. 7, 1933 |
| 2,121,416 | White | June 21, 1938 |
| 2,238,095 | Almcrantz | Apr. 15, 1941 |